United States Patent

Christou

[15] 3,681,783

[45] Aug. 1, 1972

[54] METHOD FOR EVALUATING INERTIAL PROPERTIES OF AN ARBITRARILY SHAPED SOLID

[72] Inventor: Kyriakos Christou, Detroit, Mich.

[73] Assignee: Burroughs Corporation, Detroit, Mich.

[22] Filed: March 30, 1971

[21] Appl. No.: 129,399

[52] U.S. Cl. ....................................................444/1

[51] Int. Cl. ..........................G06f 7/38, G01m 1/00

[58] Field of Search ..............441/1; 235/183; 73/65; 444/914, 1

[56] References Cited

OTHER PUBLICATIONS

L1140 0684, 674; A Mathematical Model for Mechanical Part Description, Communications of the ACM, Vol. 8, Issue 2, Feb. 65, Luh, J.Y.S., Krolak, R.J., pp. 125- 129.

*Primary Examiner*—Eugene G. Botz
*Assistant Examiner*—Edward J. Wise
*Attorney*—Kenneth L. Miller and Edwin W. Uren

[57] ABSTRACT

A computer program for evaluating the inertial properties of a homogenous solid having a known morphology, wherein the bounding surface of the solid is conceived as being formed by a finite number of triangles, each defined by the coordinates of their apices with reference to an arbitrary coordinate system. Each triangle is given a sign depending on the direction of its outward normal. The outward normal for each triangle is described by the permutation of the set of coordinates defining the triangle. Inertial properties of the solid are then evaluated by determining those properties for each tetrahedron formed by position vectors from the origin of the arbitrary coordinate system to the apices of each triangle. These properties are determined with reference to a different oblique coordinate system for each tetrahedron, such coordinate systems being defined by the respective position vectors forming each tetrahedron. The descriptions of the inertial properties with reference to the oblique coordinate systems are then transformed to descriptions in terms of the arbitrary coordinate system. The net properties of the solid with reference to the arbitrary coordinate system are then determined by algebraically summing the corresponding properties of each tetrahedron.

8 Claims, 6 Drawing Figures

INVENTOR.
KYRIAKOS CHRISTOU

METHOD FOR EVALUATING INERTIAL PROPERTIES OF AN ARBITRARILY SHAPED SOLID

BACKGROUND OF THE INVENTION

This invention relates generally to programs or processes of a digital computer and more particularly concerns the determination of inertial properties of a generalized solid body using a digital computer.

The inertial properties such as mass, center of mass location and moments of inertia are factors which must be determined in order to properly study and to design dynamic mechanical systems. The higher the speed of the moving parts of a mechanical system, the greater the need for proper dynamic analysis. Much labor and cost can be avoided by making an extensive preliminary analysis of the dynamic characteristics of a proposed mechanical system so that components may be properly designed or that an initial design may be modified before fabrication of a prototype is undertaken. The design of type slugs and print hammers in high speed printers is one example of the need for preliminary dynamic analysis of proposed configurations. Here, as in many other high speed mechanical operations of computer peripheral equipment, the great speeds of the various members and the consequent stresses imposed upon them requires that their materials and shapes be designed to withstand the resulting stresses.

Inertial properties such as mass moments of inertia have long been defined mathematically and for the determination of such properties when dealing with regular shapes such as spheres and cylinders the manual mathematical calculation of these properties is practical. However, the moving components of most high speed mechanical devices do not conform to these well-known forms so that with a solid body of irregular shape manual calculation of these properties is at least unfeasible and at the most, impossible, depending upon the complexity of the body's shape.

It is therefore an object of the present invention to uniquely organize the operations of a digital computer to evaluate specified inertial properties of a solid body having a generalized form.

It is further an object of the present invention to provide a computer program which can operate with input information that can be obtained from a bare description of the morphology of a solid body.

In one of its aspects, the present invention conceptually divides the solid body into portions of a plurality of tetrahedrons, each of which has a common apex at the origin of an arbitrarily chosen coordinate system. For the calculation of mass moments of inertia, that property is determined for each tetrahedron with respect to a different coordinate system. Then, the program transforms these components of mass moments into reference with an arbitrarily chosen coordinate system to additively determine the net property of the generalized solid body.

SUMMARY OF THE INVENTION

In accordance with the invention, information that completely describes the morphology of the solid body is stored in the computer. This information is in the form of a plurality of triadic sets of coordinates referring to an arbitrarily chosen coordinate system. Each of the sets of coordinates describe the apices of a different triangle that is conceptually inscribed on the bounding surface of the solid body. This plurality of triangles are fitted together to approximate as closely as desired the bounding surface of the solid body. The permutation of each set of coordinates corresponds with an outward normal from the surface of the solid body to achieve a sign characteristic (either positive or negative) for each bounding triangle depending upon its orientation in the coordinate system. The computer then calculates the length of the three position vectors that correspond with the three apices of each bounding triangle. The mathematical model may then be conceived as a plurality of tetrahedra with a common apex at the origin of the arbitrarily chosen coordinate system and the base of each tetrahedra formed by different ones of the bounding triangles. The computer then calculates a directional factor, such as the direction cosines of the three position vectors that define each of the tetrahedron. Mass or second moments of inertia for each tetrahedron are then calculated with reference to an oblique coordinate system that is formed by the respective position vectors of each tetrahedron. Each of these mass moments of inertia with respect to the oblique coordinate system are transformed to moments of inertia with reference to the arbitrarily chosen coordinate system. Finally, these mass moments of inertia are algebraically summed, the net result yielding the volume moments of inertia of the solid body with respect to the arbitrarily chosen coordinate system. The mathematical model may also be used by a properly programmed computer in a similar manner to evaluate other inertial properties such as mass, center of mass and volume.

BRIEF DESCRIPTION OF THE DRAWINGS

In order to facilitate a more complete understanding of the invention, a detailed description thereof is hereinafter set forth with reference to the drawings in which.

Figures 1, 2:
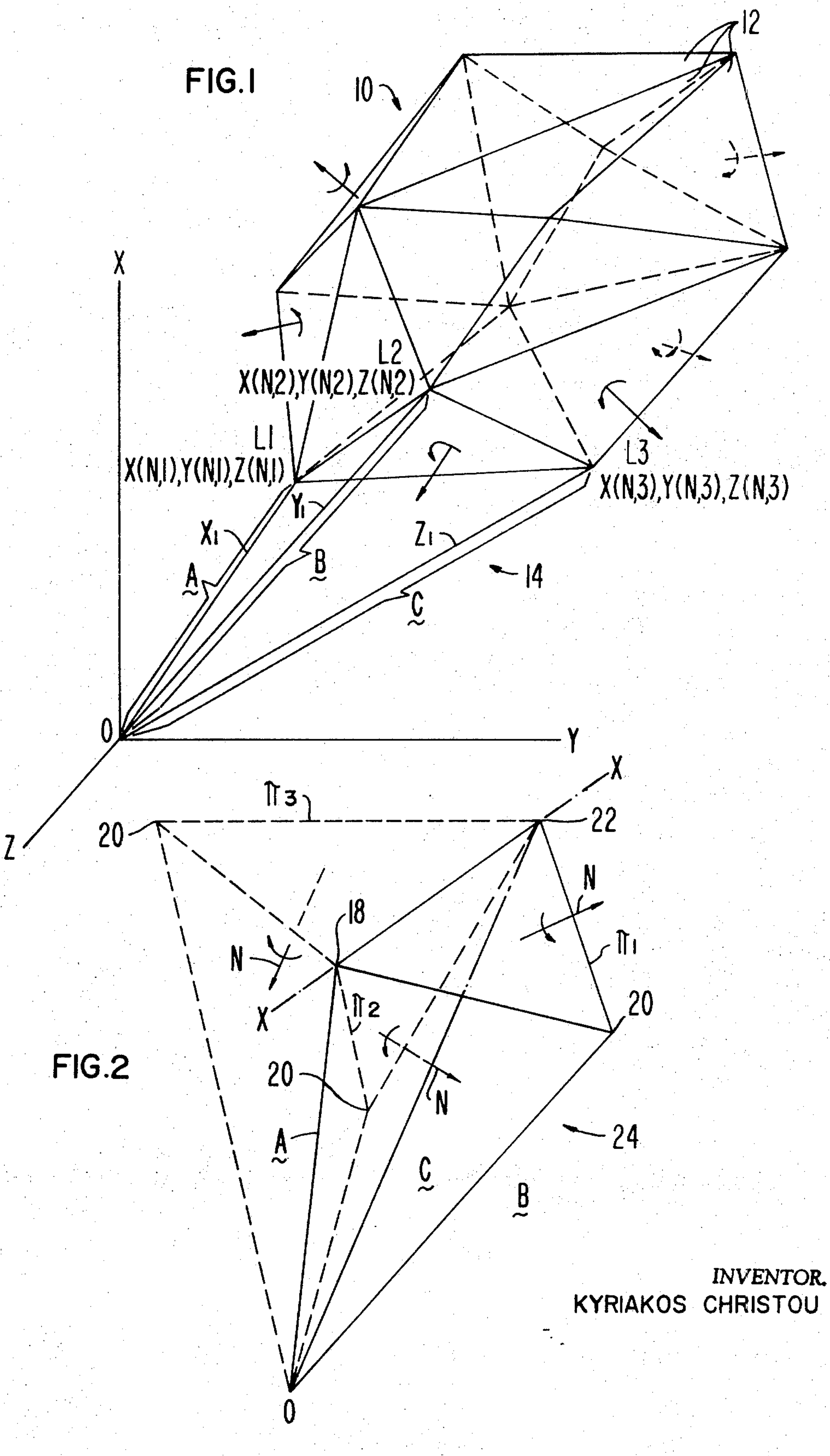
FIG. 1 is a diagram of an arbitrarily shaped solid disposed in relation to an orthogonal or first coordinate system.
FIG. 2 is a diagram illustrating the directional variation of a normal from a plane that is rotated about an axis.

The basis for the computer-implemented method is a mathematical model that is hereinafter described with reference to FIGS. 1 and 2. A solid 10 such as illustrated in FIG. 1 is conceived to be bounded by a finite number of triangles 12. If the surface of the solid 10 does not contain any curved portion then this representation is exact. On the other hand, if the surface is curved it may be approximated by dividing it up into a number of small triangular portions—the greater the number of triangular divisions the more exacting is the approximation. If the radium of a curved surface is large, the fewer the number of triangular divisions that are required to have a close approximation.

The solid can now be considered as a composition of tetrahedra, as at 14, having as their bases the triangular plane portion of the surface of the solid and as a common apex the origin O of an arbitrary right-hand, orthogonal or first coordinate system $(x,y,z)$ located inside or outside the solid 10. The space occupied by the solid 10 may thus be perceived as comprising a portion of the total volume of all of the tetrahedra. Each tetrahedra, as at 14, is assigned a positive or a negative value so that when properties regarding each are summed algebraically the net result will be that of the solid alone. The complex problem of determining the inertial properties of a generalized solid body is then reduced to finding the inertial properties of many tetrahedra, which in itself is a Herculean task made feasible only by the high calculation speeds of a modern digital computer.

The assignment of a positive or negative value to each tetrahedron is a consequence of the construction of the mathematical model. The lines joining the three apices of each base triangle 12 with the origin O of the orthogonal coordinate system are considered as position vectors, as at $\underset{\sim}{A}$, $\underset{\sim}{B}$ and $\underset{\sim}{C}$ of FIG. 1. This representation enables a tetrahedron to be endowed with a sign quality. Considered as a right-hand system, the permutations (L1, L3, L2), (L3, L2, L1) and (L2, L1, L3) are positive while (L1, L2, L3), (L2, L3, L1) and (L3, L1, L2) are negative. Thus the tetrahedron 14 inherits the sign of the permutation equivalent to that of the outward normal from its base triangle 12 or from the bounding surface of the solid.

The manner in which a tetrahedra can assume positive and negative values may be graphically illustrated by imaging one of the triangles that bind the solid, as a 16, to be rotated about a fixed axis X—X as illustrated in FIG. 2. Choosing the right-hand permutation 18, 20, 22 to initially describe a tetrahedron 24, the outward normal N from the base thereof is directed exteriorly of the tetrahedron formed by the position vectors $\underset{\sim}{A}$, $\underset{\sim}{B}$ and $\underset{\sim}{C}$ from an origin O. As the triangle or base of the tetrahedron is rotated clockwise, as shown, about the stationary axis X—X, from its initial position $\pi_1$, the volume of the tetrahedron 24 diminishes until the rotating base triangle 16 coincides with a plane intersecting the stationary axis and the origin O, as at position $\pi_2$. At this point the volume of a tetrahedron 24 is zero. Continued clockwise rotation of the base triangle to a position $\pi_3$ brings the outward normal N as defined by the initial permutation 18, 20, 22, pointing into the volume of the tetrahedron 24 which implies that the tetrahedron is negative, or for the present purposes, that the bounding triangle of the solid is on the other side of the solid 10 from the origin O. The triangles that bound a solid display the same characteristics of sign change as described above. Such triangles may be considered oriented with respect to some fixed plane and positioned with respect thereto in a multitude of angular positions, consequently giving rise to positive, negative, and even zero tetrahedra depending on their orientation. Furthermore, the orientations of all of the triangles bounding the solid body are determined by their position vectors and these vectors are simply defined by the coordinates of the apices of each bounding triangle since the position vectors emanate from the origin of the orthogonal or first coordinate system.

Using the mathematical model heretofore described, the necessary data for computing inertial properties of any solid body may then be determined from an engineering drawing or any other complete description of the shape of the solid. On an engineering drawing, for example, points must be chosen on the surface of solid to yield as close an approximation of the bounding surface as necessary. A coordinate system can then be set up and the coordinates of points listed. Each of these coordinates must then be sorted in groups of threes, each group thus describing the apices of a different triangle bounding the surface of the solid. The three coordinates describing each triangle must then be properly permuted to conform with the outward normal from the surface of the body. A list of these sets of properly permuted coordinates for each triangle bounding the surface of the solid body represents a complete source of information from which all inertial properties may be calculated, assuming the mass density of the solid is known.

The computer is programmed to act upon these data to arrive at values for inertial properties such as center of mass and mass moments of inertia with respect to any chosen coordinate system. The program may take one of several forms, however, the most important steps in any of the forms can best be described in connection with the determination of the mass moment of inertia about an arbitrarily chosen, or first coordinate system.

Describing the computer process now in detail, information completely describing the morphology of the solid 10 is first stored triangles bounding a computer memory. This is programmatically accomplished in the present instance by creating a first input file containing a label for each point or apex on the surface of the solid 10. Coordinates of each point with respect to the first coordinate system are listed along with a corresponding label. The first input file would look like this:

| Labels | Coordinates |
|---|---|
| L1 | $x(N,1)$, $y(N,1)$, $z(N,1)$ |
| L2 | $x(N,2)$, $y(N,2)$, $z(N,2)$ |
| . | |
| . | |
| . | |
| L$n$ | $x(N,n)$, $y(N,n)$, $z(N,n)$ |

A second file is created in which the labels of the first file representing the apices of the traingles bounding the surface of the solid are listed in groups of threes in a permuted order that conforms to an outward normal from the surface of the solid. A corresponding sequence number that identifies each triangle is also listed. The second input file would look like this:

| Sequence No. | Permutation |
|---|---|
| 1 | L1, L4, L2 |
| 2 | L2, L4, L3 |
| . | |
| . | |
| . | |
| N | LN, L(N−1), L(N−2) |

Figure 4:
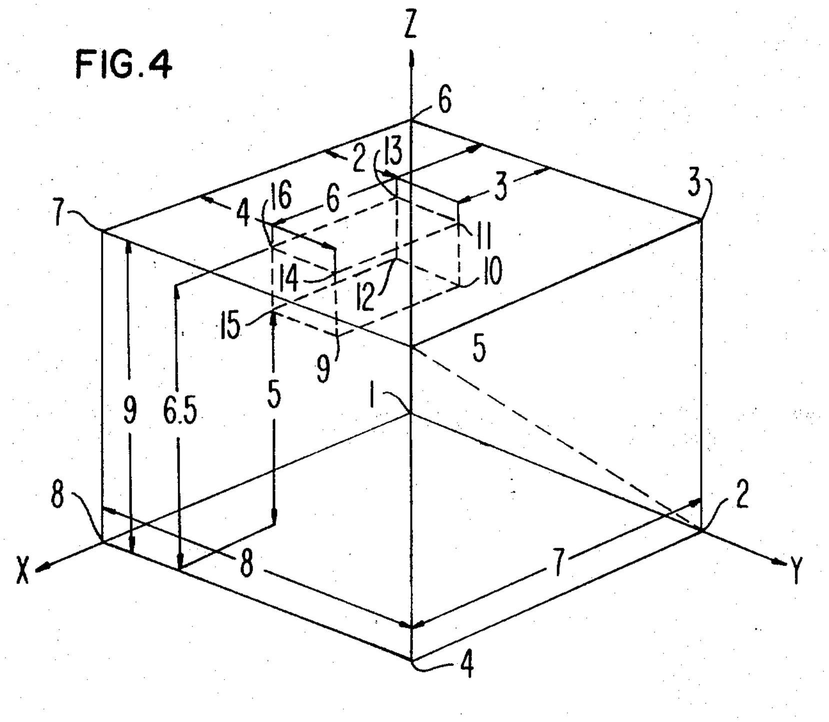
FIG. 4 is a diagram of a prism with the axes of an orthogonal coordinate system coincidentally disposed in relation to three respective edges thereof.

Serving as a simple example of the manner in which input data for the program may be created, a solid in the form of a right prism with a prismatic cavity, as illustrated in FIG. 4, is inscribed with points (1–16) on the surface thereof. An arbitrarily chosen orthogonal or first coordinate system is positioned so that three sides of the prism coincide with the *xz*, *yz* and *xy* planes. A first file is created listing the labels for each point and their corresponding coordinates:

| LABELS | COORDINATES (x, y, z) |
|---|---|
| 1 | 0, 0, 0 |
| 2 | 0, 8, 0 |
| 3 | 0, 8, 9 |
| 4 | 7, 8, 0 |
| 5 | 7, 8, 9 |
| 6 | 0, 0, 9 |
| 7 | 7, 0, 9 |
| 8 | 7, 0, 0 |
| 9 | 6, 4, 5 |
| 10 | 3, 4, 5 |
| 11 | 3, 4, 6.5 |
| 12 | 3, 2, 5 |
| 13 | 3, 2, 6.5 |
| 14 | 6, 4, 6.5 |
| 15 | 6, 2, 5 |
| 16 | 6, 2, 6.5 |

The points are then grouped in triadic sets, the permutation of each set corresponding with an outward normal from the surface of the prism. Each triadic set thus conceptually defines a triangle on the surface of the prism including the surface of the inner prismatic cavity. Any three of a possible six permutations of the three points respectively identifying the apices of each triangle may be used to describe the triangle. The other three permutations define normals directed interiorly of the prism. The collection of permutations corresponding with the outward normals from each triangle on the surface of the prism of FIG. 4 is:

| | | | | |
|---|---|---|---|---|
| 542 | or | 425 | or | 254 |
| 523 | or | 235 | or | 352 |
| 753 | or | 537 | or | 375 |
| 736 | or | 367 | or | 673 |
| 784 | or | 847 | or | 478 |
| 745 | or | 457 | or | 574 |
| 13 12 10 | or | 12 10 13 | or | 10 13 12 |
| 13 10 11 | or | 10 11 13 | or | 11 13 10 |
| 15 16 9 | or | 16 9 15 | or | 9 15 16 |
| 9 16 14 | or | 16 14 9 | or | 14 9 16 |
| 16 15 13 | or | 15 13 16 | or | 13 16 15 |
| 13 15 12 | or | 15 12 13 | or | 12 13 15 |
| 14 16 13 | or | 16 13 14 | or | 13 14 16 |
| 14 13 11 | or | 13 11 14 | or | 11 14 13 |
| 12 15 9 | or | 15 9 12 | or | 9 12 15 |
| 12 9 10 | or | 9 1. 12 | or | 10 12 9 |
| 9 14 10 | or | 14 10 9 | or | 10 9 14 |
| 10 14 11 | or | 14 11 10 | or | 11 10 14 |

From this collection of permutations one of the three defining each triangle may be used to create a second file. This file lists a sequence number identifying a particular triangle with the chosen one of the three possible permutations that define the corresponding triangle. This file may take the form of

| SEQUENCE NO. | PERMUTATION |
|---|---|
| 1 | 542 |
| 2 | 523 |
| 3 | 753 |
| 4 | 736 |
| 5 | 784 |
| 6 | 745 |
| 7 | 13 12 10 |
| 8 | 13 10 11 |
| 9 | 9 14 10 |
| 10 | **10 14 11** |
| 11 | 15 16 9 |
| 12 | 9 16 14 |
| 13 | 16 15 13 |
| 14 | 13 15 12 |
| 15 | 14 16 13 |
| 16 | 14 13 11 |
| 17 | 12 15 9 |
| 18 | 12 9 10 |

One other input factor for the program is the mass density which in this case is assumed to be constant, i.e., that the solid is homogeneous. If the mass density were not constant, but could be represented by a mathematical function, the disclosed process could be adapted to account for this factor.

Under the direction of the program the computer then operates to sort the two files into triadic arrays. Each of these arrays consists of three properly permuted sets of coordinates that describe the position of the apices of each triangle that bounds the surface of the solid. Consequently, each tetrahedron is then represented by nine real numbers, such as:

$$x(N,1),\ y(N,1),\ z(N,1)$$
$$x(N,2),\ y(N,2),\ z(N,2)$$
$$x(N,3),\ y(N,3),\ z(N,3)$$

where "N" is the sequence number identifying the tetrahedra.

Using the example described above in connection with FIG. 4, the tetrahedron (or triangle) identified by sequence no. 1 in the second file would be represented by:

| | | |
|---|---|---|
| 7 | 8 | 9 |
| 7 | 8 | 0 |
| 0 | 8 | 0 |

With the sorting phase of the program completed all the information necessary to begin the process of calculating inertial properties of the solid has been assembled.

Using an arbitrarily chosen orthogonal or first coordinate system, such as shown in FIG. 1, the mass moment of inertia tensor of a tetrahedron in three dimensional space is defined as:

$$\underset{\approx}{I} = \iiint_V \rho(\underset{\sim}{r})\,(r^2 \underset{\approx}{e} - \underset{\sim}{r}\underset{\sim}{r})\,dv \qquad (1)$$

where $\underset{\approx}{e} = \underline{i}\underline{i} + \underline{j}\underline{j} + \underline{k}\underline{k}$ is the identifying tensor, where $\rho(\underline{r})$ is a density function in terms of position vector $r$ (this function is considered a constant in the present application), and where V is the volume of the tetrahedron over which the triple integral is evaluated.

The mass moment of inertia tensor in component form may be expressed:

$$\underset{\approx}{I} = \iiint_V \rho(x,y,z) \begin{bmatrix} y^2+z^2 & -xy & -xz \\ -xy & x^2+z^2 & -yz \\ -zx & -zy & x^2+y^2 \end{bmatrix} \qquad (2)$$

With a solid having a complex shape, the solution of this triple integral with reference to an orthogonal coordinate system is difficult even with the aid of an automated calculator. To simplify this problem it is possible to perform the triple integration over the volume of an arbitrary tetrahedron in terms of right-hand oblique coordinate system whose coordinates are in the direction of the three vectors that define the tetrahedron, such as $\underline{A}$, $\underline{B}$ and $\underline{C}$, shown in FIG. 1.

The triple integral of a general function $\int(x,y,z)$ over a volume V is defined as:

$$I = \lim_{\substack{\Delta x_i \to 0 \\ \Delta y_i \to 0 \\ \Delta z_i \to 0}} \sum_i f(x_i, y_i, z_i)\,\Delta V_i \qquad (3)$$

where $\Delta V_i$ may be defined in vector notation as a so-called scalar triple product, i.e., $$\Delta V_i = \Delta \underset{\sim}{x_i} \cdot (\Delta \underset{\sim}{y_i} \times \Delta \underset{\sim}{z_i})$$

In determining a mathematical expression for the second moment of inertia of an arbitrary tetrahedron with respect to the oblique coordinate system, it will be noted that under a transformation of coordinate systems the function $f(x_i, y_i, z_i)$ does not change value, but instead takes on a different form, e.g., $g(x_i', y_i', z_i')$. In a similar manner the volume of a tetrahedron remains constant when the coordinate systems are transformed, e.g., $$\Delta V_i = \Delta \underset{\sim}{x_i} \cdot (\Delta \underset{\sim}{y_i} \times \Delta \underset{\sim}{z_i}) = \Delta \underset{\sim}{x_i}' \cdot (\Delta y_i' \times \Delta \underset{\sim}{z_i}')$$

Recognizing the definitions of dot and cross products, $$\Delta \underset{\sim}{x_i}' \cdot (\Delta \underset{\sim}{y_i}' \times \Delta \underset{\sim}{z_i}') = \Delta x_i' \, \Delta y_i' \Delta z_i' \cos b \sin a$$

where $a$ is the angle between $y'$ and $z'$ and $b$ is the angle between $x'$ and a normal to the $y'z'$ plane.

The triple integral of a general function may then be written:

$$I = \lim_{\substack{\Delta x_i' \to 0 \\ \Delta y_i' \to 0 \\ \Delta z_i' \to 0}} \sum_i g(x_i', y_i', z_i')\,\Delta x_i', \Delta y_i', \Delta z_i' \cos b \sin a \qquad (4)$$

or written in terms of an integral:

$$I = \cos b \sin a \iiint_v g(x_i', y_i', z_i')\, dx'\, dy'\, dz' \qquad (5)$$

If $g(x_i', y_i' z_i')$ were the function defining moment of inertia, equation (5) would determine that property for a single tetrahedron described with reference to an oblique coordinate system formed by the position vectors of apices of the base triangle, as at $\underset{\sim}{A}$, $\underset{\sim}{B}$ and $\underset{\sim}{C}$ of FIG. 1.

Length of vectors that define a particular tetrahedron, as at $\underset{\sim}{A}$, $\underset{\sim}{B}$ and $\underset{\sim}{C}$ in FIG. 1, may be found by the use of a well-known formula from analytic geometry:

$$A = \sqrt{x(N,1)^2 + y(N,1)^2 + z(N,1)^2}$$
$$B = \sqrt{x(N,2)^2 + y(N,2)^2 + z(N,2)^2}$$
$$C = \sqrt{x(N,3)^2 + y(N,3)^2 + z(N,3)^2}$$

Also, the plane that intersects the oblique coordinate system at $A$, $B$, and $C$, that is, the bounding triangle on the surface of the solid may be expressed in terms of the oblique coordinate system as:

$$\frac{x_1}{A} + \frac{y_1}{B} + \frac{z_1}{C} = 1$$

Each of the terms contained in the expression (2) for a moment of inertia tensor in the orthogonal or first coordinate system $(x, y, z)$ may now be expressed in terms of the oblique coordinate system $(x_1, y_1, z_1)$ as follows:

$$Q_1 = \sin a \cos b \int_0^{C} \int_0^{B\left(1-\frac{z_1}{C}\right)} \int_0^{A\left(1-\frac{y_1}{B}-\frac{z_1}{C}\right)} x_1^2\, dx_1\, dy_1\, dz_1 \qquad (6)$$

if:

$$\sin a = P_1$$
$$\cos b = P_2$$

the triple integration of $g(x_1y_1z_1) = x_1^2$ over the volume of one tetrahedra yields:

$$Q_1 = P_1 P_2 \frac{A^3BC}{60} \qquad (7)$$

a similar calculation for $g(x_1y_1z_1) = y_1^2$ yields:

$$Q_2 = P_1 P_2 \frac{B^2AC}{60} \qquad (8)$$

for $g(x_1y_1z_1) = z_1^2$ yields:

$$Q_3 = P_1 P_2 \frac{C^3AB}{60} \qquad (9)$$

for $g(x_1y_1z_1) = x_1y_1$ yields:

$$Q_4 = P_1 P_2 \frac{CA^2B^2}{120} \qquad (10)$$

for $g(x_1y_1z_1) = x_1z_1$ yields:

$$Q_5 = P_1 P_2 \frac{BA^2C^2}{120} \qquad (11)$$

and for $g(x_1y_1z_1) = y_1z_1$ yields:

$$Q_6 = P_1 P_2 \frac{AB^2C^2}{120} \qquad (12)$$

$Q_1$—$Q_6$ are defined as mass moments of inertia with respect to the oblique coordinate system. The physical significance of these quantities is vague but their evaluation is important in the present computer process.

The determination of $P_1$ is carried out in the following manner:

$$P_1 = \sin a = \left| \frac{\underset{\sim}{B} \times \underset{\sim}{C}}{\underset{\sim}{B}\ \ \underset{\sim}{C}} \right|$$

$$\underset{\sim}{B} \times \underset{\sim}{C} = \begin{vmatrix} i & j & k \\ x(N,2) & y(N,2) & z(N,2) \\ x(N,3) & y(N,3) & z(N,3) \end{vmatrix}$$

$$U_1 = y(N,2)z(N,3) - z(N,2)y(N,3)$$
$$U_2 = z(N,2)x(N,3) - x(N,2)z(N,3)$$
$$U_3 = x(N,2)y(N,3) - y(N,2)x(N,3)$$
$$P_1 = \frac{\sqrt{U_1^2 + U_2^2 + U_3^2}}{BC} \qquad (13)$$

$P_2$ is evaluated in the following manner:

$$P_2 = \cos b = \frac{(\underset{\sim}{B} \times \underset{\sim}{C}) \cdot \underset{\sim}{A}}{|\underset{\sim}{B} \times \underset{\sim}{C}|\,|\underset{\sim}{A}|}$$

Since the numerator is the scalar triple product or volume $V_t$ of the tetrahedra (the evaluation of which will hereinafter be shown):

$$P_2 = \frac{V_t}{A\sqrt{U_1^2 + U_2^2 + U_3^2}} \qquad (14)$$

Considering now the transformation of the mass moments of inertia from the oblique coordinate system to the orthogonal or first coordinate system, from FIG. 1, we can write the expressions:

$$x=\frac{x(N,1)}{A}x_1+\frac{x(N,2)}{B}y_1+\frac{x(N,3)}{C}z_1$$
$$y=\frac{y(N,1)}{A}x_1+\frac{y(N,2)}{B}y_1+\frac{y(N,3)}{C}z_1$$
$$z=\frac{z(N,1)}{A}x_1+\frac{z(N,2)}{B}y_1+\frac{x(N,3)}{C}z_1 \qquad (15)$$

It will be noted that the terms $x(N, 1)/A$, $x(N, 2)/B$, etc. are direction cosines of the oblique coordinate axes ($x$, $y$, $z$) with respect to the orthogonal coordinate axes. Equations (15) may be written $$\begin{Bmatrix}x\\y\\z\end{Bmatrix}=\begin{bmatrix}\frac{x(N,1)}{A} & \frac{x(N,2)}{B} & \frac{x(N,3)}{C}\\ \frac{y(N,1)}{A} & \frac{y(N,2)}{B} & \frac{y(N,3)}{C}\\ \frac{z(N,1)}{A} & \frac{z(N,2)}{B} & \frac{z(N,3)}{C}\end{bmatrix}\begin{Bmatrix}x_1\\y_1\\z_1\end{Bmatrix} \qquad (16)$$

where RO is the density of the solid, assumed for the purpose of this illustration to be a constant.

An evaluation of matrix (22) determines signed values for mass moments of inertia for one tetrahedron. The programmed computer evaluates each of these values, then algebraically sums all of them to obtain a net value for the arbitrarily shaped solid with respect to the orthogonal coordinate system. These steps are illustrated between reference characters 25 and 27 in the flow chart of FIG. 3 and between lines 720 and 1200 in the appended program print out. The appended program print out shows that the $P_1$ and $P_2$ terms are excluded from the calculation of the oblique moments of inertia $Q_1 - Q_6$. Consequently, the $J_1 - J_6$ terms of the appended program printout are multiplied by $P_1$ and $P_2$ at a later time in the program, as at line 1120. This programmatic expediency reduces the number of individual operations required by the computer and in no material way diverts from the procedural concept hereinbefore described.

$$\begin{bmatrix}T_1V_1W_1\\T_2V_2W_2\\T_3V_3W_3\end{bmatrix}=\begin{bmatrix}\frac{x(N,1)}{A} & \frac{x(N,2)}{B} & \frac{x(N,3)}{C}\\ \frac{y(N,1)}{A} & \frac{y(N,2)}{B} & \frac{y(N,3)}{C}\\ \frac{z(N,1)}{A} & \frac{z(N,2)}{B} & \frac{z(N,3)}{C}\end{bmatrix} \qquad (17)$$

Thus equation 15 can be written:

$$\begin{Bmatrix}x\\y\\z\end{Bmatrix}=\begin{bmatrix}T_1V_1W_1\\T_2V_2W_2\\T_3V_3W_3\end{bmatrix}\begin{Bmatrix}x_1\\y_1\\z_1\end{Bmatrix} \qquad (18)$$

Forming all the possible dyadic combinations of $x$, $y$, $z$: (19)

$$x^2=T_1^2x_1^2+V_1^2y_1^2+W_1^2z_1^2+2(T_1V_1x_1y_1+T_1W_1x_1z_1+V_1W_1y_1z_1)$$
$$y^2=T_2^2x_1^2+V_2^2y_1^2+W_2^2z_1^2+2(T_2V_2x_1y_1+T_2W_2x_1z_1+V_2W_2y_1z_1)$$
$$z^2=T_3^2x_1^2+V_3^2y_1^2+W_3^2z_1^2+2(T_3V_3x_1y_1+T_3W_3x_1z_1+V_3W_3y_1z_1)$$
$$xy=T_1T_2x_1^2+V_1V_2y_1^2+W_1W_2z_1^2+(T_1V_2+V_1T_2)x_1y_1+(T_2W_1+W_2T_1)x_1z_1+(V_2W_1+W_2V_1)y_1z_1$$
$$xz=T_1T_3x_1^2+V_1V_3y_1^2+W_1W_3z_1^2+(T_1V_3+V_1T_3)x_1y_1+(W_1T_3+W_3T_1)x_1z_1+(W_1V_3+W_3V_1)y_1z_1$$
$$yz=T_2T_3x_1^2+V_2V_3y_1^2+W_2W_3z_1^2+(T_2V_3+T_3V_2)x_1y_1+(T_2W_3+T_3W_2)x_1z_1+(V_2W_3+W_2V_3)y_1z_1$$

Now, by definition:

$$J_1=\iiint_V x^2dv$$
$$J_2=\iiint_V y^2dv$$
$$J_3=\iiint_V z^2dv$$
$$J_4=\iiint_V xydv$$
$$J_5=\iiint_V xzdv$$
$$J_6=\iiint_V yzdv \qquad (20)$$

Then, substituting equations (19) into equations (20) then equations (7) — (12) into the resulting equations:

$$J_1=T_1^2Q_1+V_1^2Q_2+W_1^2Q_3+2(T_1V_1Q_4+T_1W_1Q_5+V_1W_1Q_6)$$
$$J_2=T_2^2Q_2+V_2^2Q_2+W_2^2Q_3+2(T_2V_2Q_4+T_2W_2Q_5+V_2W_2Q_6)$$
$$J_3=T_3^2Q_1+V_3^2Q_2+W_3^2Q_3+2(T_3V_3Q_4+T_3W_3Q_5+V_3W_3Q_6)$$
$$J_4=T_1T_2Q_1+V_1V_2Q_2+W_1W_2Q_3+(T_1V_2+V_2T_1)Q_4+(T_2W_1+W_2T_1)Q_5+(V_2W_1+W_2V_1)Q_6$$
$$J_5=T_1T_3Q_1+V_1V_3Q_2+W_1W_3Q_3+(T_1V_3+T_1V_3)Q_4+(W_1T_3+W_3T_1)Q_5+(W_1V_3+W_3V_1)Q_6$$
$$J_6=T_2T_3Q_1+V_2V_3Q_2+W_2W_3Q_3+(T_2V_3+T_3V_2)Q_4+(T_2W_3+T_3W_2)Q_5+(V_2W_3+W_2V_3)Q_6 \qquad (21)$$

The mass moment of inertia tensor of the tetrahedra with respect to the orthogonal or first coordinate system may be expressed by the following expression:

$$\underline{\underline{I(K,L)}}=RO\begin{bmatrix}J_2+J_3 & J_4 & J_5\\ J_4 & J_1+J_3 & J_6\\ J_6 & J_6 & J_1+J_2\end{bmatrix} \qquad (22)$$

As stated, the process of evaluating the mass moment of inertia for an arbitrarily shaped solid presents the primary aspect of the present computer process. The mathematical model set up for this evaluation, however, may also be conveniently used to evaluate other important inertial properties of the solid, such as position of the center of mass as well as volume.

From basic geometry it is known that the volume of a tetrahedron is equal to one-sixth of the volume of a parallelapied having a base volume equal to twice that of the tetrahedron. Since the tetrahedra in the present example have been described in terms of vecotrs, the volume of one may be determined by the so-called scalar triple product as follows:

$$V_t = 1/6\, \underset{\sim}{R}(N,1) \cdot \underset{\sim}{R}(N,2) \times \underset{\sim}{R}(N,3) \qquad (23)$$

where $\underset{\sim}{R}(N,J) = x(N,J)\underset{\sim}{i} + y(N,J)\underset{\sim}{j} + z(N,J)\underset{\sim}{K}$, $J = 1, 2$ and 3.

It will be noted that $\underset{\sim}{R}(N,J)$, $J = 1$, 2 and 3 are the position vectors of the apices of the tetrahedra corresponding with $\underset{\sim}{A}$, $\underset{\sim}{B}$ and $\underset{\sim}{C}$ of FIG. 1. The evaluation of $V_t$ for various tetrahedra will yield different sign qualities so that when the $V_t$'s are algebraically summed the net volume of the entire solid $V$ will result. The programmatic calculation of each $V_t$ is carried out in the following manner:

$$Vt = 1/6 \begin{bmatrix} x(N,1), & y(N,1), & z(N,1) \\ x(N,2), & y(N,2), & z(N,2) \\ x(N,3), & y(N,3), & z(N,3) \end{bmatrix} \qquad (24)$$

where:

$$V_1 = \frac{x(N,1)y(N,2)z(N,3) - y(N,3)z(N,2)}{6}$$

$$V_2 = \frac{-y(N,1)x(N,2)zN,3) - x(N,3)z(N,2)}{6}$$

$$V_3 = \frac{z(N,1)x(N,2)y(N,3) - x(N,3)y(N,2)}{6} \qquad (25)$$

and $$Vt = V_1 + V_2 + V_3 \qquad (26)$$

the $V_t$'s are algebraically summed to obtain the net volume $V$ for the solid.

Figure 3:
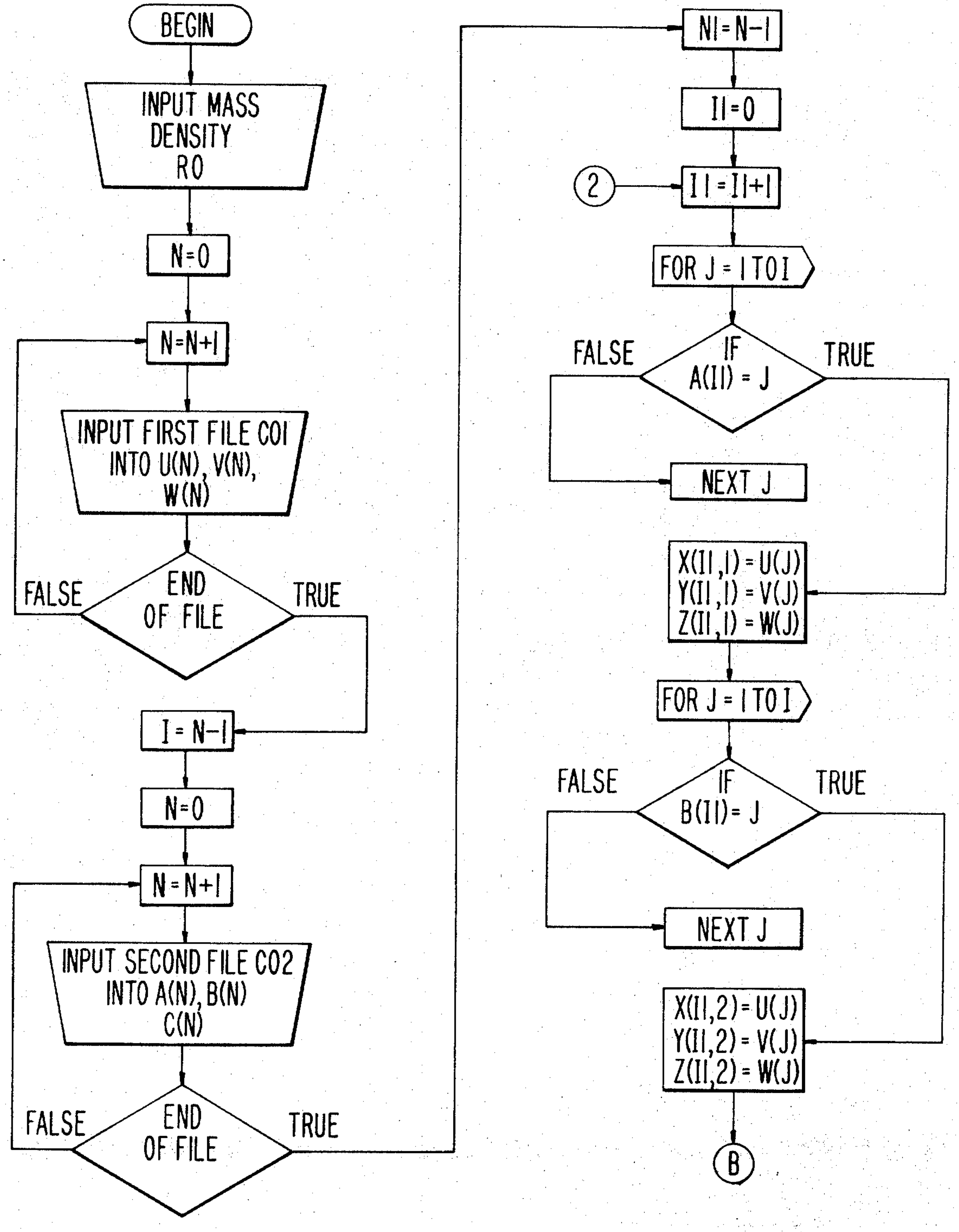
FIGS. 3, 3A and 3B are, in composite, a flow chart illustrating the steps in the preferred method.
Figure 3A:
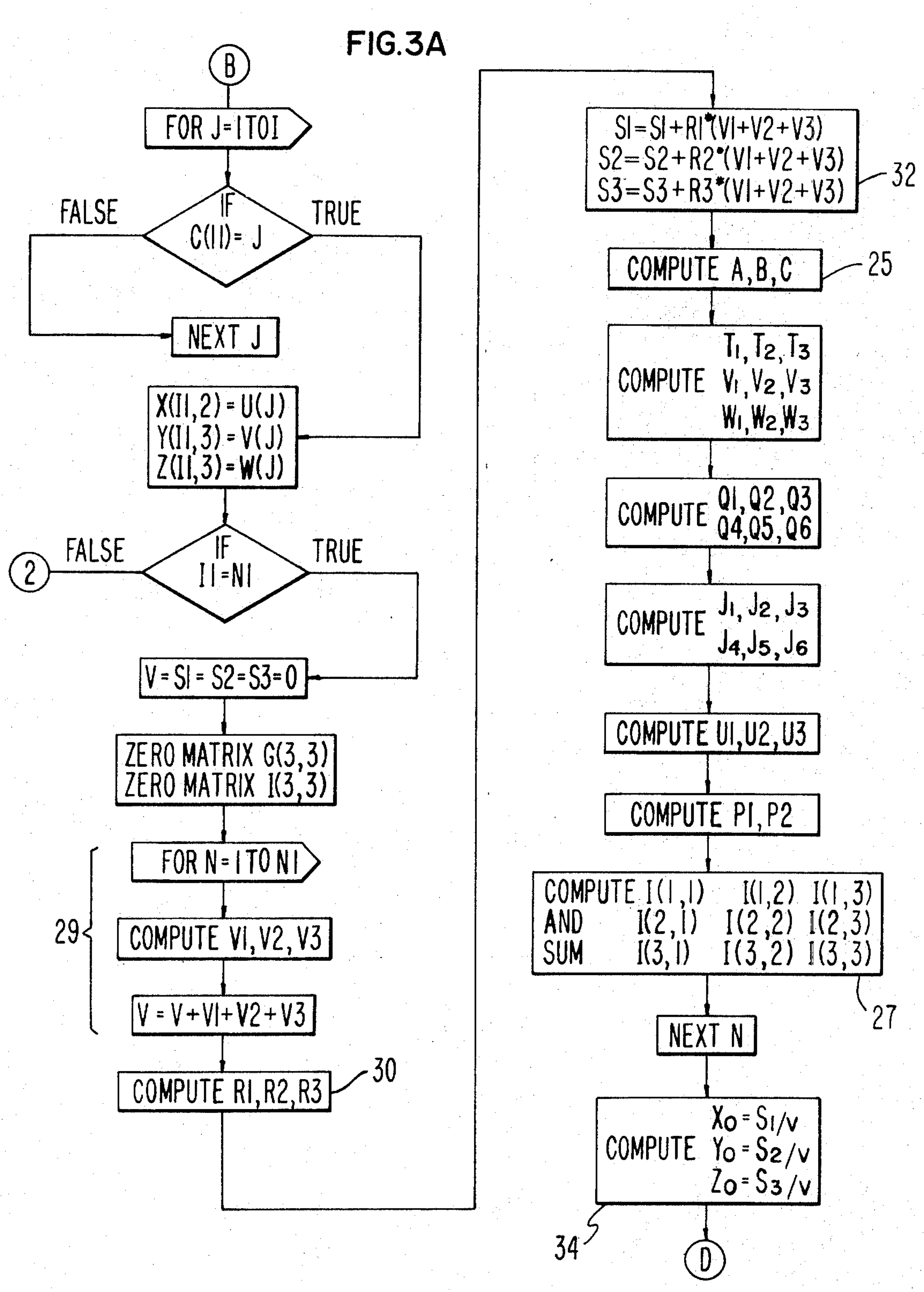
Figure 3B:
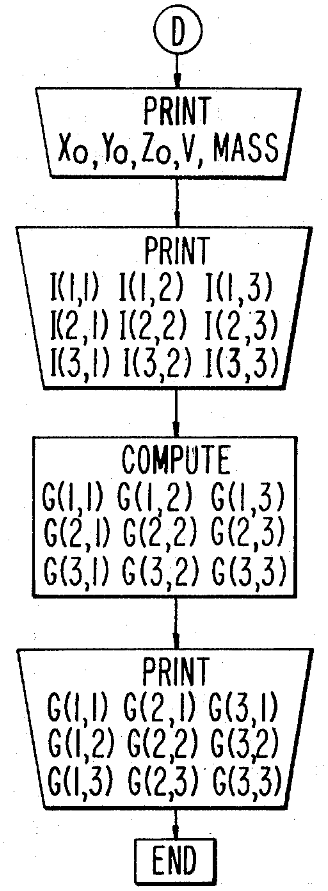

This evaluation is shown programmatically implemented between lines 680 and 720 of the appended program and the flow chart of FIG. 3 at 29.

For evaluating the position of the center of mass, the manipulation of a triple integral is avoided by applying the rule that the center of mass of a tetrahedron is equivalent to the center of mass of four equal masses placed at the apices of the tetrahedron; therefore, knowing the coordinates of the apices of a tetrahedron, its center of mass can be found by the following steps:

$$R_1 = \frac{x(N,1) + x(N,2) + x(N,3)}{4}$$

$$R_2 = \frac{y(N,1) + y(N,2) + y(N,3)}{4}$$

$$R_3 = \frac{z(N,1) + y(N,2) + z(N,3)}{4} \qquad (27)$$

where $M$ is mass.

To find the center of mass of the entire solid the first moments of inertia S of each tetrahedron are calculated by the following expressions:

$$S_x = R_1(V_1 + V_2 + V_3)$$

$$S_y = R_2(V_1 + V_2 + V_3)$$

$$S_z = R_2(V_1 + V_2 + V_3) \qquad (28)$$

where $(V_1 + V_2 + V_3)$ equals the volume $V_t$ of a corresponding tetrahedra. The first moments of all the tetrahedra are added to obtain the first moments of the entire solid $S_1$, $S_2$, $S_3$. Then the expressions $$X_o = \frac{S_1}{V}, \; Y_o = \frac{S_2}{V}, \; Z_o = \frac{S_3}{V} \qquad (29)$$

determine the position of the center of mass for the entire solid. These steps are programmatically illustrated between lines 730 and 780 and lines 1220 and 1240 in the appended program and at 30, 32 and 34 in the flow chart of FIG. 3.

Once the mass moments of inertia, volume and center of mass of the arbitrarily shaped solid have been evaluated with respect to the first coordinate system, these properties may be used to calculate other inertial properties. For example, the parallel axis theorem may be easily applied to determine the mass moment of inertia with respect to a coordinate system having its origin positioned at the center of mass of the solid. Similarly, principal moments of inertia and the directions of the principal axes for the solid may be readily evaluated by well known mathematical definitions given the properties determined by the present program.

While the present computer process has been described in conjunction with a preferred embodiment it is evident that many modifications and alternatives not truly departing from the inventive concept residing therein will be apparent to those skilled in the art in light of the foregoing description. Accordingly, it is intended to embrace within the appended claims all such modifications and alternatives that reside within the inventive concept disclosed herein.

A duplication of a computer printout listing the steps of a specific computer program written in BASIC is appended hereto. This program was written for a Burroughs 5500 and substantially conforms to the flow chart illustrated in FIGS. 3. Also appended is a duplicated computer printout showing the output that would be obtained applying the present program to the example hereinbefore described with reference to FIG. 4.

COMPUTER PROGRAM IN BASIC

```
REM CENTER OF MASS, VOLUME, AND MASS MOMENTS OF INERTIA
REM OF A GENERAL SOLID BOUNDED BY A FINITE NUMBER OF PLANES
PRINT"IF YOU KNOW HOW TO RUN THIS PROGRAM,AND YOU HAVE ALREADY"
PRINT"PREPARED THE INPUT FILES CO1,CO2,..TYPE (YES)"
PRINT"(AFTER THE QUESTION MARK)---OTHERWISE,TYPE (NO),AND WAIT"
PRINT"FOR FURTHER INSTRUCTIONS."
INPUT A$
IF A$ \EQ "YES" THEN 240
PRINT"     BEFORE RUNNING THIS PROGRAMM YOU MUST CREATE AND SAVE"
PRINT"TWO INPUT FILES IN BASIC(CO1,CO2) SEPERATELY."
PRINT"     FILE CO1 MUST CONTAIN THE COORDINATES OF ALL POINTS"
PRINT"THAT DESCRIBE THE SOLID.THE FILE STATEMENT NUMBERS"
PRINT"MUST BE THE LABELS OF THESE POINTS.THE COORDINATES"
PRINT"MUST BE SEPERATED BY COMMAS.NO END STATEMENT IS NEEDED."
PRINT"     FILE CO2 MUST CONTAIN THE EVEN PERMUTATIONS OF THE//
      //LABELS"
PRINT"OF THE SAME POINTS TAKEN BY THREE(ONLY ONE FROM EACH//
      //TRIPLE)"
PRINT"IN SUCH A WAY THAT THE THREE POINTS DEFINE A PLANE ON THE"
PRINT"SURFACE OF THE SOLID.THE LABELS THAT MAKE THE PERMUTATION"
PRINT"MUST BE SEPERATED BY COMMAS.NO END STATEMENT IS NEEDED."
PRINT"     IT IS RECOMMENDED THAT YOU STUDY THE REPORT"
PRINT"COVERING THIS PROGRAM IF YOU ARE RUNNING THIS PROGRAM"
PRINT"FOR THE VERY FIRST TIME."
GO TO 2870
PRINT"TYPE IN THE VALUE OF MASS DENSITY IF YOU KNOW IT;//
      //OTHERWISE,"
PRINT"TYPE IN  1 (AFTER THE QUESTION MARK).IT  IS VALID"
PRINT"TO MULTIPLY THE RESULTS BY THE PROPER  MASS DENSITY AT"
PRINT"THE END OF THE PROGRAM."
FILES CO1,CO2
DIM A(500),B(500),C(500),U(500),V(500),W(500)
DIM X(500,3),I(3,3),Y(500,3),Z(500,3)
```

```
DIM E(2,2),L(3,3),G(3,3),T(2,1),F(2,2),H(2,1),R(1,3)
INPUT RQ
N=0
N=N+1
INPUT FILE C01:370,U(N),V(N),W(N)
GO TO 340
I=N-1
N=0
N=N+1
INPUT FILE C02:420,A(N),B(N),C(N)
GO TO 390
N1=N-1
I1=0
I1=I1+1
FOR J=1 TO I
IF A(I1) /EQ J THEN 480
NEXT J
X(I1,1)=U(J)
Y(I1,1)=V(J)
Z(I1,1)=W(J)
FOR J=1 TO I
IF B(I1) \EQ J THEN 540
NEXT J
X(I1,2)=U(J)
Y(I1,2)=V(J)
Z(I1,2)=W(J)
FOR J=1 TO I
IF C(I1) \EQ J THEN 600
NEXT J
X(I1,3)=U(J)
Y(I1,3)=V(J)
Z(I1,3)=W(J)
IF I1 \EQ N1 THEN 650
GO TO 440
V=S1=S2=S3=0
MAT I = ZER
MAT G=ZER(3,3)
FOR N=1 TO N1
V1=X(N,1)*(Y(N,2)*Z(N,3)-Y(N,3)*Z(N,2))/6
V2=-Y(N,1)*(X(N,2)*Z(N,3)-X(N,3)*Z(N,2))/6
V3=Z(N,1)*(X(N,2)-X(N,3)*Y(N,2))/6
V=V+V1+V2+V3
R1=(X(N,1)+X(N,2)+X(N,3))/4
R2=(Y(N,1)+Y(N,2)+Y(N,3))/4
R3=(Z(N,1)+Z(N,2)+Z(N,3))/4
S1+S1+R1*(V1+V2+V3)
S2=S2+R2*(V1+V2+V3)
S3=S3+R3*(V1+V2+V3)
A=SOR(X(N,1)**2+Y(N,1)**2+Z(N,1)**2)
B=SQR(X(N,2)**2+Y(N,2)**2+Z(N,2)**2)
C=SOR(X(N,3)**2+Y(N,3)**2+Z(N,3)**2)
IF A*B*C \EQ O THEN 1210
T1=X(N,1)/A
T2=Y(N,1)/A
T3=Z(N,1)/A
V1=X(N,2)/B
V2=Y(N,2)/B
V3=Z(N,2)/B
W1=X(N,3)/C
W2=Y(N,3)/C
W3=Z(N,3)/C
Q1=A**3*B*C/60
Q2=B**3*A*C/60
Q3=C**3*A*B/60
Q4=C*A**2*B**2/120
Q5=B*A**2*C**2/120
Q6=A*B**2*C**2/120
J1=I1**2*Q1+V1**2*Q2+W1**2*Q3+2*(T1*V1*Q4+T1*W1*Q5+V1*W1*Q6)
J2=I2**2*Q1+V2**2*Q2+W2**2*Q3+2*(T2*V2*Q4+T2*W2*Q5+V2*W2*Q6)
J3=I3**2*Q1+V3**2*Q2+W3**2*Q3+2*(T3*V3*Q4+T3*W3*Q5+V3*W3*Q6)
J4=T1*T2*Q1+V1*V2*Q2+W1*W2*Q3+(T1*V2+T2*V1)*Q4+(T2*W1+W2*T1)*Q5
J4=Z4+(V2*W1+W2*V1)*Q6
J5=T1*T3*Q1+V1*V3*Q2+W1*W3*Q3+(T1*V3+V1*T3)*Q4+(W1*A3+W3*T1)*Q5
J5=Z5+(W1*V3+V1*W3)*Q6
J6=T2*T3*Q1+V2*V3*Q2+W2*W3*Q3+(T2*V3+V2*T3)*Q4+(T2*W3+T3*W2)*Q5
J6=Z6+(V2*W3+V3*W2)*Q6
U1=Y(N,2)*Z(N,3)-Z(N,2)*Y(N,3)
U2=Z(N,2)*X(N,3)-X(N,2)*Z(N,3)
U3=X(N,2)*Y(N,3)-Y(N,2)*X(N,3)
P1=SQR(U1**2+U2**2+U3**2)/B/C
IF P1 \EQ O THEN 1210
P2=6*(V1+V2+V3)/A/SQR(U1**2+U2**2+U3**2)
I(1,1)=I(1,1)+RO*(J2+J3)*P1*P2
I(1,2)=I(1,2)-RO*J4*P1*P2
I(1,3)=I(1,3)-RO*J5*P1*P2
I(2,1)=I(1,2)
I(2,2)=I(2,2)+RO*(J1+J3)*P1*P2
I(2,3)=I(2,3)-RO*J6*P1*P2
I(3,1)=I(1,3)
I(3,2)=I(2,3)
I(3,3)=I(3,3)+RO*(J1+J2)*P1*P2
NEXT N
XO=S1/V
YO=S2/V
ZO=S3/V
PRINT
PRINT"THE CENTER OF MASS LOCATION,VOLUME AND MASS ARE:"
PRINT
PRINT
PRINT"     XO          YO          ZO          V          M"
PRINT
PRINT
PRINT XO,YO,ZO,V,RO*V
PRINT
PRINT
PRINT"THE MASS MOMENTS OF INERTIA ABOUT THE ORIGIN ARE:"
PRINT
PRINT
MAT PRINT I
PRINT
PRINT END
```

The results from the program applied to the solid illustrated in Fig. 4 are:

CENTER OF MASS LOCATION, VOLUME AND MASS ARE:

| XO | YO | ZO | V | M |
|---|---|---|---|---|
| 3.481818 | 4.018182 | 4.477273 | 495 | 495 |

THE MASS MOMENTS OF INERTIA ABOUT THE ORIGIN ARE:

| | | |
|---|---|---|
| 23976.75 | -6934.5 | -7705.125 |
| -6934.5 | 21351.75 | -8916.75 |
| -7705.125 | -8916.75 | 18711 |

What is claimed is:

1. A method for evaluating inertial properties of an arbitrarily shaped solid comprising the steps of:
   assigning an array of points on the bounding surface of the solid, said array being grouped in threes such that the three points in each triadic group form apices of a triangle, said array of triadically grouped points thus constructing a surface of contiguous triangles bounding the surface of the solid;
   storing in the memory of a digital computer a list of the coordinates of the points in each triadic group with respect to an arbitrarily chosen first coordinate system, each triadic group of coordinates being permuted to correspond with an outward normal from the surface of the solid;
   calculating in said digital computer a selected inertial property for each tetrahedron formed by the position vectors from the origin of the first coordinate system to the apices of each triangle bounding the surface of the solid; and
   algebraically summing in said digital computer the selected inertial properties of all the tetrahedron to obtain a net inertial property for said arbitrarily shaped solid.

2. A method for evaluating inertial properties of an arbitrarily shaped solid comprising the steps of:
   assigning an array of points on the bounding surface of the solid, said array being grouped in threes such that the three points in each triadic group forms apices of a triangle, said array of triadically grouped points thus constructing a surface of contiguous triangles bounding the solid;
   storing in the memory of a digital computer a list of the coordinates of the points in each triadic group with respect to an arbitrarily chosen first coordinate system, each triadic group of coordinates being permuted to correspond with an outward normal from the surface of the solid;
   calculating in said digital computer a selected inertial property for each tetrahedron formed by three position vectors emanating respectively from the origin of the first coordinate system to the apices of each triangle bounding the surface of the solid with reference to an oblique coordinate system formed by said three position vectors;
   transforming in said digital computer each of the selected inertial properties with reference to the oblique coordinate system to reference with the first coordinate system; and
   algebraically summing all of said transformed inertial properties in said digital computer to obtain the net inertial property of said solid with reference to said first coordinate system.

3. The method defined in claim 2 wherein the selected inertial properties calculated with reference to said oblique coordinate system are algebraically summed before transforming the resulting inertial property to reference with said first coordinate system.

4. In a digital computer a method for evaluating the mass moment of inertia of an arbitrarily shaped solid wherein the surface bounding the solid is approximately described by a finite number of contiguous triangles, the method comprising the steps of:
   storing a list of coordinates with reference to an arbitrarily chosen first coordinate system, said list of coordinates being grouped in triadic sets each describing the three apices of a different bounding triangle, the permutation of each triadic set corresponding with an outward normal from the surface of said solid;

calculating the length of three position vectors emanating respectively from the origin of said first coordinate system to the three apices of an associated bounding triangle;

calculating the respective directions of said three position vectors with respect to said first coordinate system;

calculating the mass moments of inertia for the tetrahedron formed by said three position vectors and said associated bounding triangle with reference to an oblique coordinate system also formed by said three position vectors;

transforming said mass moments of inertia of the tetrahedron from reference with the oblique coordinate system to reference with the first coordinate system; and algebraically summing the respective mass moments of inertia of all tetrahedron described with reference to said first coordinate system to obtain the mass moments of inertia of said solid with reference to said first coordinate system.

5. The method as defined in claim 4 wherein the step of storing includes the steps of:

storing a first file containing the coordinates of the apex of each triangle with respect to an arbitrarily chosen first coordinate system and a label for each of the coordinates;

storing a second file containing one triadic permutation of the labels representing the apices of each triangle, each permutation corresponding with an outward normal from the surface of the solid; and sorting said first and second files to obtain a list contraining a plurality of triadic sets of coordinates describing the bounding triangles of the solid, the coordinates in each triadic set of coordinates being permuted to correspond with the outward normal from the surface of the solid.

6. The method as defined in claim 4 wherein the respective mass moments of inertia calculated for each tetrahedron with reference to said oblique coordinate system are algebraically summed before being transformed to reference with said first coordinate system to obtain the net mass moments of inertia of said solid with respect to said first coordinate system.

7. The method as defined in claim 4 wherein said arbitrarily chosen first coordinate system is a three dimensional, right hand, orthogonal coordinate system.

8. The method as defined in claim 7 wherein the respective directions of said three position vectors are determined by the direction cosines of each position vector with respect to the three axes of said first coordinate system.

* * * * *

PO-1050
(5/69)

UNITED STATES PATENT OFFICE
CERTIFICATE OF CORRECTION

Patent No. 3,681,783 Dated August 1, 1972

Inventor(s) Kyriakos Christou

It is certified that error appears in the above-identified patent and that said Letters Patent are hereby corrected as shown below:

Col. 2, line 65, should read --radius of a--.
Col. 4, line 33, should read --stored in a computer--.
Col. 5, line 43, should read --9 10 12--.
Col. 8, line 4, should read --Q1 = sin--.

Col. 9, line 6, should read -- $\frac{z(N,3)}{C}$ $z_1$

Col. 11, line 12, should read --vectors--.

Signed and sealed this 3rd day of July 1973.

(SEAL)
Attest:

EDWARD M.FLETCHER,JR.
Attesting Officer

Rene Tegtmeyer
Acting Commissioner of Patents